United States Patent
Bachmann et al.

(10) Patent No.: US 12,352,366 B2
(45) Date of Patent: Jul. 8, 2025

(54) OPERATION-SAFE REPLACEMENT OF A CONTROL HEAD

(71) Applicants: Bürkert Werke GmbH & Co. KG, Ingelfingen (DE); Burkert USA Corp., Huntersville, NC (US)

(72) Inventors: René Bachmann, Großröhrsdorf (DE); Larry Kubacki, Huntersville, NC (US)

(73) Assignees: Bürkert Werke GmbH & Co. KG, Ingelfingen (DE); Burkert USA Corp., Huntersville, NC (US)

( * ) Notice: Subject to any disclaimer, the term of this patent is extended or adjusted under 35 U.S.C. 154(b) by 1421 days.

(21) Appl. No.: 16/904,812

(22) Filed: Jun. 18, 2020

(65) Prior Publication Data

US 2021/0396330 A1    Dec. 23, 2021

(51) Int. Cl.
*F16K 37/00*        (2006.01)

(52) U.S. Cl.
CPC .................... *F16K 37/00* (2013.01)

(58) Field of Classification Search
CPC ....................................... F16K 37/00
See application file for complete search history.

(56) References Cited

U.S. PATENT DOCUMENTS

| 6,484,745 B1 * | 11/2002 | Navarro | B67D 1/1256 |
| | | | 137/15.05 |
| 2013/0233416 A1 * | 9/2013 | Uwe | F16K 37/0025 |
| | | | 137/554 |

* cited by examiner

*Primary Examiner* — Nirvana Deonauth
(74) *Attorney, Agent, or Firm* — Carlson, Gaskey & Olds, P.C.

(57) ABSTRACT

A method for an operation-safe replacement of a control head is provided. The control head is configured to actuate a movement of a target and defines at least a first operating position according to which the target is arranged prior to exchanging the control head for a replacement control head. After exchange, the replacement control head receives configuration data and parameters of the exchanged control head. The replacement control head defines at least a second operating position. The second operating position of the replacement control head generally corresponds to the first operating position defined by the exchanged control head. A position sensing system is provided to sense a position of the target after the exchange procedure. An indicator unit is used to provide a state indicator, wherein the state indicator at least depends on a difference between the position of the target and the second operating position defined by the replacement control head.

16 Claims, 3 Drawing Sheets

Fig. 3

OPERATION-SAFE REPLACEMENT OF A CONTROL HEAD

TECHNICAL FIELD

A method for an operation-safe replacement of a control head, a control head, and a process valve are provided.

BACKGROUND

A process valve for regulating process media comprises a piston rod in order to determine the operating state of the valve. To move the piston rod between different operating positions corresponding to the different operating states of the valve, the control head comprises an actuator. After installation, the control head needs to be adapted to the specific stroke range of the process valve. Commonly, this is achieved using manual or automatic teach functions.

When replacing a (defective/broken) control head (e.g. during the night shift), there is often no possibility to activate the affected process valve, as otherwise process media (e.g. milk) could flow unintentionally. In such cases, it is common practice to replace the broken control head by a replacement control head and to subsequently teach only a single position (usually for the operating state "CLOSED" of the process valve). The in-operation teaching for a single position is commonly done via manual teach functions so that the control program of the higher-level system can continue. However, in such an event a full teaching of all operating positions defined by the replacement control head is omitted in order to reduce the downtime of the higher-level system as much as possible. Accordingly, the control head is not fully taught all operating positions of the piston rod.

Moreover, currently available replacement control heads fail to indicate (neither via a status display at the device itself nor via electronic communication with the higher-level control system) that further operating positions still need to be taught. Such "post-replacement" teaching is usually omitted until the next cleaning or maintenance of this section of the process system. Only then, the control head can be entirely taught all operating positions. In the meantime, if the workers do not have a sufficient understanding of the process or of the replacement control head, further production downtimes may occur if the control program of the process system does not receive an expected feedback (due to missing teach-in of a specific operating position).

Even if the tight manufacturing tolerances are maintained or a characteristic curve correction for the position sensing system is applied during the production of control heads, statistical characteristic curve fluctuations occur for different control head specimens. In the food and pharmaceutical industries, very narrow tolerance fields (feedback ranges) are required for the operating positions of the piston rods (process valve position) in order to guarantee process reliability or product quality. Without the execution of manual or automatic teach functions after having applied a replacement control head, there is always the risk of the piston rod positions eventually being arranged outside the predefined feedback ranges or at least being arranged in fringe areas of those feedback ranges. Accordingly, the conformity between the piston rod and the replacement control head is suboptimal.

All known products either require an activation of the process valve to fully teach the replacement control head all operating positions which is not possible at all times without creating disturbances for the production process. A different approach is applying an operation-tune function of the process system. However, such an operation-tune function is an indirect measure insofar that the control head is not fully taught all operating positions either but that additional components are used to compensate the differences of the flow of the process media regulated by the process valve. In both such approaches, the limited teaching of the operating positions of the replacement control head is not automatically indicated.

SUMMARY

According to an aspect, a method for an operation-safe replacement of a control head is provided. The control head may be suitable for a process valve or may be an exchangeable component of a process valve. The process valve may be a device configured to influence a flow of process medium. The process valve and/or a control head may be a field device within a process system.

The control head can be configured to actuate a movement of a target. The target may be a piston rod of a process valve. The target may be configured to control an operating state of a process valve. In particular the operating state of the process valve may be any of an open configuration in which a flow of a process medium is enabled, a closed configured in which a flow of a process medium is prohibited, a lower maintenance configuration (e. g. in-process lower valve seat cleaning), and an upper maintenance configuration (e. g. in-process upper valve seat cleaning). Lower and upper maintenance configurations are to be understood not to refer to a maintenance requiring disassembling of the process valve but represent in-process seat lift configurations, so when the device/system is closed. This refers to in-process (closed device/system) cleaning configurations, e.g. subsequent to completing a single batch process.

The target can be configured to be arrangeable according to a plurality of operating positions. The plurality of operating positions can be defined by the control head. The plurality of operating positions can comprise different specific positions corresponding to the various operating states of the process valve. For example, the piston rod can be arrangeable in a first operating position in which the process valve is open, in a second operating position in which the process valve is closed, in a fully retracted position according to the lower maintenance configuration, and in an intermediate position according to the upper maintenance configuration.

The control head can define at least a first operating position according to which the target is arranged prior to a replacement of the control head. The first operating position can be any of a plurality of operating positions defined by the control head according to which the target is arrangeable.

The method can comprise exchanging a first control head (broken control head or control head to be exchanged) for a replacement control head.

The method can also comprise receiving configuration data and parameters of the exchanged control head by the replacement control head after the exchange procedure. This means that the replacement control head can be configured to receive configuration data and parameters of the exchanged control head. The configuration data and parameters can include information concerning the state of the exchanged control head and/or the target and/or the process valve prior to the exchange procedure. Accordingly, the replacement control head can adapt controlling of the target to the state prior to the exchange procedure.

Due to the received configuration data and parameters, the replacement control head can be configured to define at least a second operating position. The second operating position defined by the replacement control head can generally correspond to the first operating position defined by the exchanged control head. In other words, subsequent to the exchange procedure the target is supposed to be arranged according to the second operating position defined by the replacement control head. In other words, in an ideal case according to which no differences between the first control head and the replacement control head exist, the first operating position defined by the first (to be exchanged) control head would entirely coincide with the second operating position defined by the replacement control head. However, due to tolerances and statistical fluctuations during the manufacturing process or the mounting the first and second operating positions generally are different from each other.

Within the context of the present application defining an operating position by a control head (no matter whether by the exchanged control head or the replacement control head) is to be understood such that the operating position is set by the respective control head such that the desired corresponding operating configuration of the process valve can be provided. In other words, the respective control head presets/provides an operating position for the target such that the process valve (in particular the shut-off device of the process valve) can adapt to the desired operating configuration (operating state). The target can be directly or indirectly coupled to a shut-off device of the process valve. Consequently, the operating configuration of the process valve may be determined by the position of the target. For example, the target needs to be arranged in a first position in order to provide a process valve which is open and which enables the flow of a process medium. In contrast, if the process valve is supposed to prohibit the flow of a process medium, the target has to be arranged in a second position, wherein the second position is different from the first position. Therefore, different operating positions may be "defined" by a control head in order to provide different operating configurations/states of the process valve.

The method can also comprise sensing a position of the target after having exchanged the first control head for the replacement control head utilizing a position sensing system. The position of the target can be sensed relative to the replacement control head. The position sensing system can be external to the replacement control head or can be a part of it. The position sensing system can be configured to provide electronic information with regard to the sensed position of the target. In particular, the electronic information can be provided to the replacement control head.

The above mechanism can be regarded a "transfer tune". In a traditional teach function, two, three or four valve position values are recorded. These values are stored as absolute values. This means that each value is recorded as a distance from an absolute zero. When a control head is replaced (on-off control head or proportional controller), new values for the different configurations must be provided to the new control head. If it is assumed that the new control head has the exact dimensions as the old control head and that the new control head has been installed in exactly the same position as the old control head, then a simple transfer of absolute position values would be sufficient. However, the likelihood of these conditions occurring all of time is not great. Usually, the relative positions of the process valve (distances between the specific positions) remain constant when exchanging a process valve for a replacement valve. In other words, whereas the absolute closed position value may change from a first process valve to a different process valve, the relative distances between the closed and open positions or any other positions are likely to be same. In this regard, "transfer tune" records the absolute position of the original process valve and then translates these absolute positions to relative positions. If an original control head fails and one assumes that the process valve is in the closed position when the failing occurs, then the new process valve's closed position becomes the new zero. The other relative positions of the process valve are then provided to the new control head such that the new control head and the process valve are now ready for operation. This means the process valve does not need to opened and closed (moved at all) in order to configure the new control head.

Moreover, the method can include providing a state indicator utilizing an indicator unit. The indicator unit can be coupled to the replacement control head or can be a part of it. The state indicator can represent information depending on the conformity of the position of the target relative to the second operating position defined by the replacement control head. The state indicator can also represent information concerning the status of the process valve. In addition, the state indicator can represent information concerning the teaching of at least the second operating position of the replacement control head relative to the (sensed) position of the target. The state indicator can also represent information concerning the teaching of a plurality of operating positions defined by the replacement control head relative to multiple (sensed) positions of the target. In particular, according to the method the state indicator can be automatically provided. Furthermore, the state indicator can be provided to the user of the process valve.

The indicator unit can comprise a status display arranged at the process valve and/or at the replacement control head. The indicator unit can also be configured to communicate the state indicator to a different component of the process system, especially one of a field device, a gateway, and a higher-level control system (master device). The field device can also be a different control head.

Utilizing the above method the status of the process valve with regard to the teaching of at least one operating position defined by the replacement control head relative to the (sensed) position of the target can be clearly and unambiguously provided to the user or to a higher-level system (control system). As the statistical fluctuations between different specimens of control heads cannot be avoided, differences of the operating positions defined by these different specimens can generally not be excluded. However, based on the above method a high reliability of the process system is provided as the user is provided with clear information concerning the state of the replacement control head relative to the target. Accordingly, the risk of unintentional downtime of the system can be reduced.

In particular, the first operating position of the piston rod can represent a position in which the process valve is closed. The piston rod having a position in which the process valve is closed may be of high relevance so that a flow of a process medium controlled by the process valve is prevented with high reliability. In this regard, the piston rod having a position such that the process valve is closed may be regarded as being of higher importance than the remaining positions. In other words, if the offset to zero is adjusted for the closed position of the process valve, it may be of lower importance if the open position of the process valve (slope) is slightly off.

The control head can comprise or can be coupled to a communication unit. By utilizing the communication unit, the control head can be configured to receive configuration data and parameters of a different control head. A control head can be configured to communicate its configuration data and parameters to a field device, a gateway, or higher-level control system such as a master device of the process system. The configuration data and parameters can also include specific information concerning the target and/or the process valve to which the respective control head is applied. After having exchanged the control head, the replacement control head can be configured to receive such stored configuration data and parameters of an exchanged control head. Optionally an external memory may be used to store the configuration data and parameters. Accordingly, the replacement control head may in principle be provided with the possibility to be configured similar to the control head which was removed from the system. Hence, by using such a communication unit, the replacement control head cannot only be configured similar to the previous control head but can also be configured similar with regard to the target and/or the process valve.

The communication unit can especially be adapted for use within an industrial communication system such as a field bus system which can provide the possibility of automatically writing the configuration data and parameters of a control head into a newly installed control head after an exchange. The field bus system can be an industrial field bus system such as büS (Bürkert System Bus). A memory can be coupled to the field bus system in order to provide a possibility of storing configuration data and parameters of control heads. Accordingly, various criteria (e.g. device type, version) can be taken into account. The industrial communication system can be implemented, for example, via a field device, a gateway or another higher-level control device that manages the configuration data and parameters. Alternatively (and usually associated with greater effort for the user), this process can also be carried out manually by a kind of "file transfer" using a suitable tool. In this regard, a process valve and/or a control head represent a field device of such a field bus system.

The control head can comprise a data processing unit. The data processing unit can especially be configured to receive information from the position sensing system. Accordingly, the data processing unit can be configured to determine a difference between the sensed position of the target and an operating position defined by the replacement control head.

The data processing unit can also be coupled to the indicator unit. This way, the state indicator provided by the indicator unit can be based on the difference determined by the data processing unit.

The state indicator can have at least a first value and a second value. The first and/or the second value can depend on whether a teaching of all operating positions defined by the replacement control head with respect to the target has already be performed. This means that the state indicator can indicate to a user that no complete parameterization of the replacement control head with regard to the specific target (piston rod) and/or process valve has been performed yet. Moreover, the state indicator can also be configured to indicate to the user whether an emergency mode using the replacement control head is possible. For example, the state indicator can have the first value until for all specific positions of the plurality of operating positions defined by the replacement control head the difference between the position of the target and the specific operating position is determined.

The first and/or second value and optionally also a third value can also depend on the size of the difference of the position of the target relative to at least one operating position defined by the replacement control head. The state indicator can switch from the first value to the second value if for the specific operating position according to which the target is arranged when the exchange procedure takes place the difference of the position of the target and the second operating position defined by the replacement control head is smaller than or equal to a first distance and for all remaining operating positions defined by the replacement control head the difference is smaller than or equal to a second distance, wherein the second distance can be equal to or larger than the first distance. Preferably, the second distance is larger than the first distance. The position in which the target is arranged when the exchange procedure takes place can be most important with regard to the replacement control head. Accordingly, the conformity of the position of the target with regard to this "exchange"-operating position of the target should be higher compared with the remaining operating positions defined by the replacement control head. Therefore, the first distance, which in essence can be considered to define a tolerance range about the "exchange"-operating position, can be the smallest range. For the remaining operating positions defined by the replacement control head the conformity should then be within an acceptable range. However, this range can be larger compared with the "exchange"-operating position. Hence, the second distance, which can be considered to define a different but still acceptable tolerance range about the respective remaining operating positions defined by the replacement control head, can be larger than the first distance. The state indicator having the first value can represent a mode of operation of the replacement control head in which maintenance (teaching) of the replacement control head is recommended. This may be due to the remaining differences between the position of the target and the respective operating positions defined by the replacement control head which should be balanced by a "full"-teaching of the replacement control head. The "full"-teaching can be executed in order to adapt the configuration data and parameters and/or characteristic curves of the replacement control head to the specific setup. If the state indicator has the second value, the replacement control head can be configured to execute its usual control and/or feedback functions.

In contrast, if the difference of the position of the target and the second operating position defined by the replacement control head is larger than the first distance but smaller than or equal to a third distance, then the state indicator can persist at having the first value. The third distance can be equal to or larger than the second distance. Preferably, the third distance is larger than the second distance. In this regard, the third distance can be considered to define yet another tolerance range corresponding to an emergency mode of the process valve. In other words, according to the emergency mode the process valve may still be operated. However, the state indicator having the second value may indicate that maintenance (teaching) of the replacement control head is required. If the state indicator has the first value, the replacement control head can be configured to execute its usual control and/or feedback functions.

The state indicator may also persist at having the first value if for any of the remaining operating positions (not the "exchange"-operating position) defined by the replacement control head the difference between the position of the target and the respective operating position is larger than the second distance but smaller than or equal to the third distance. In this scenario there can be high conformity of the position of the target with the second operating position (which corresponds to the "exchange"-operating position) defined by the replacement control head. However, at least for one of the remaining operating positions defined by the replacement control head the conformity can be acceptable only to the extent of the emergency mode of the process valve.

The state indicator can also have a third value. The third value can indicate that the difference between the position of the target and a specific operating position defined by the replacement control head is larger than the third distance for at least one operating position defined by the replacement control head. In this scenario, at least for a single operating position defined by the replacement control head according to which the target is supposed to be arranged, the target is dislocated to an extent not acceptable anymore. As a consequence, the state indicator having the third value can be considered to indicate an error state of the replacement control head and/or of the process valve. If the state indicator has the third value, a further actuation of the replacement control head and/or the target can be prohibited in order to avoid danger for the overall process.

Accordingly, different scenarios of the conformity between the position of the target and at least one operating position defined by the replacement control head can be identified using the state indicator having different values.

Within the context of the present application the difference between the position of the target and a specific operating position defined by a control head is always to be determined if the target is supposed to be arranged according to this operating position. For example, if a control head defines a first and a second operating position and the target supposedly is arranged according to the first operating position, then only the difference between the position of the target (piston rod) and the first operating position is determined. Evaluation of the difference between the position of the target and the second operating position is omitted if the target is not supposed to be arranged according to the second operating position.

Due to the statistical fluctuations between different specimens of the control heads, the first operating position defined by the first control head prior to the exchange of the control head does not coincide with the second operating position defined by the replacement control head after having performed the exchange. Accordingly, the position of the target generally does not coincide with the second operating position after having applied the replacement control head. In this regard, the above-mentioned state indicator provides a clear indication concerning the reliability of the operating positions defined by the replacement control head relative to the position of the target. Therefore, using the absolute position of the target the state indicator provides clear information to which extent maintenance work concerning the replacement control head is recommended or required or whether the replacement control head/process valve is in an error state.

According to another aspect, a control head configured for performing the above-described method is provided.

According to yet another aspect, a process valve is provided. The process valve can comprise a control head configured for performing the above-described method.

The control head can comprise at least one of a position sensing system configured to sense a position of the target and an indicator unit configured to provide a state indicator.

As the skilled person undoubtedly is aware of, any of the above-mentioned aspects can be combined with each other in any meaningful combination according to the needs of a specific control head and/or process valve and/or of a method to be carried out by a control head.

BRIEF DESCRIPTION OF THE DRAWINGS

Further aspects and characteristics will ensue from the following description of preferred embodiments with reference to the accompanying drawings, wherein.

DETAILED DESCRIPTION

Figure 1:
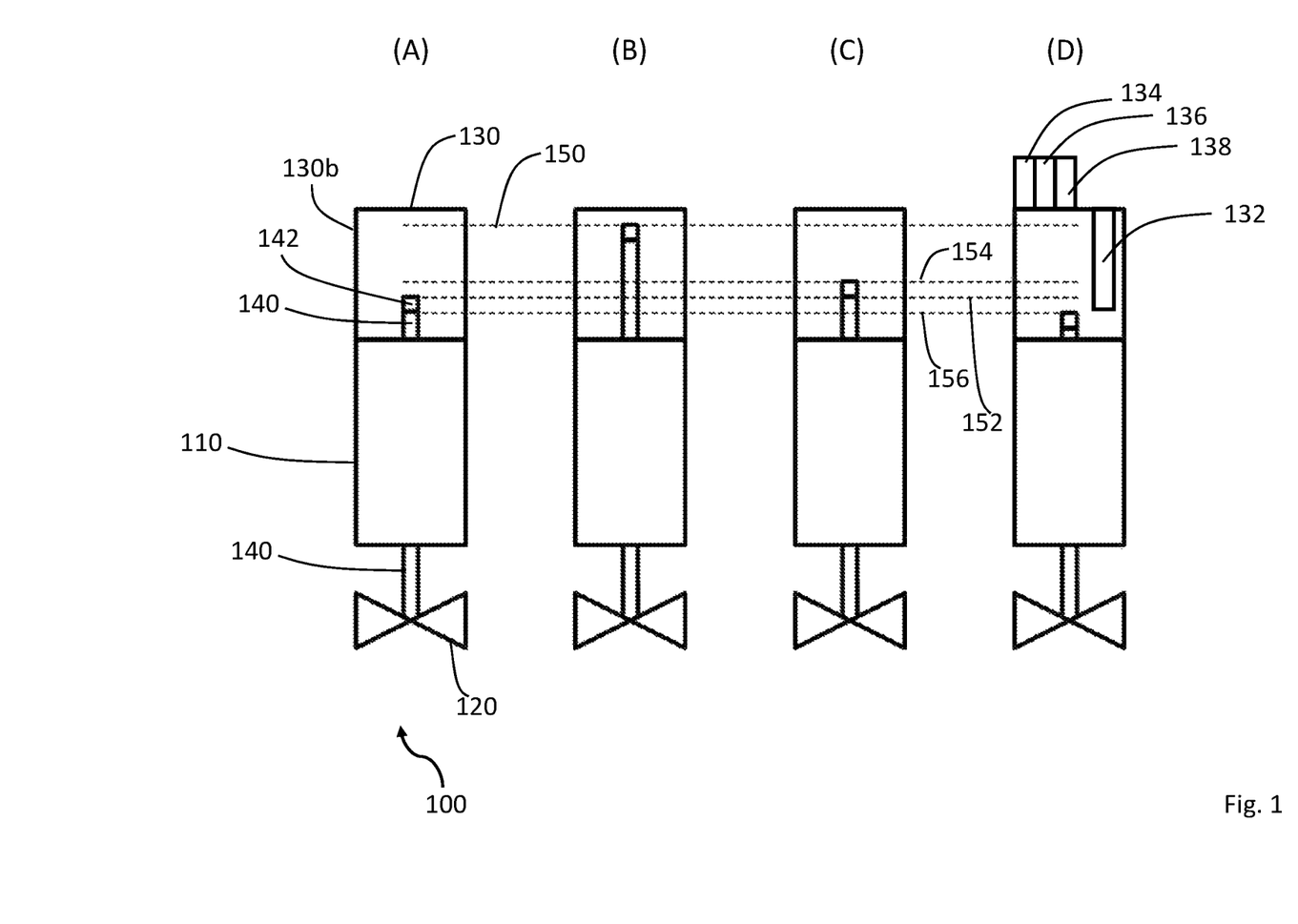
FIG. 1 shows a simplified schematic representation of the operating positions of a control head.

FIG. 1 shows a simplified schematic model of a process valve 100 according to four different configurations A to D. The process valve 100 is implemented as a field device in a process system. The process valve 100 comprises a housing 110, a shut-off device 120, a control head 130 being a replacement control head 130b, and a piston rod (target) 140. The piston rod 140 comprises a front end 142. Using the front end 142 of the piston rod 140, the position of the piston rod 140 within the replacement control head 130b is defined. Actuating the piston rod 140 causes the shut-off device 120 to change its position such that the flow of a process medium can be influenced. The replacement control head 130b is used to actuate the piston rod 140.

The four different configurations A to D of the process valve 100 represent four different operating positions 150, 152, 154, 156 defined by the replacement control head 130b. In each of the different configurations A to D, the front end 142 of the piston rod 140 is differently arranged. Configuration A corresponds to a closed configuration of the process valve 100 according to which the front end 142 of the piston rod 140 is arranged at operating position 152. Configuration B corresponds to an open configuration of the process valve 100 according to which the front end 142 of the piston rod 140 is arranged at a different operating position 150. Configuration C corresponds to an upper maintenance configuration of the process valve 100 according to which the front end 142 of the piston rod 140 is arranged at yet another operating position 154. Configuration D corresponds to a lower maintenance configuration of the process valve 100 according to which the front end 142 of the piston rod 140 is arranged at yet another operating position 156.

The replacement control head 130b can also comprise a position sensing system 132. The position sensing system 132 can be configured to sense the position of the front end 142 of the piston rod 140 within the control head 130b.

Furthermore, the replacement control head 130b can comprise a data processing unit 134, a communication unit 136, and an indicator unit 138 to indicate a state of the process valve 100.

For simplicity reasons the position sensing system 132, the data processing unit 134, the communication unit 136, and the indicator unit 138 are shown for configuration D only. However, these components are part of the replacement control head 130b also for the remaining configurations A to C.

Based on the communication unit 136 the replacement control head 130b can be configured to communicate with a different field device such as the control head 130 of a different process valve 100, a gateway, or a higher-level component of the process system. Generally, the replacement control head 130*b* may also be configured to communicate with several devices using a single communication unit 136. The communication unit 136 can also be configured to communicate with an industrial field bus system such as büS (Bürkert System Bus), wherein the process valves 100 and/or control heads 130 may be field devices of this bus system.

The replacement control head 130*b* can receive configuration data and parameters in order to adapt to the specific use case of the process valve 100. For example, after having exchanged a specific control head 130 using a replacement control head 130*b*, the replacement control head 130*b* receives the configuration data and parameters of the control head 130 which was replaced. To this end, each control head 130 can be configured to communicate its configuration data and parameters to some device having a storage memory.

Accordingly, the replacement control head 130*b* can define the operating positions 150, 152, 154, 156 such that they in principle correspond to the operating positions of the replaced control head 130. However, due to statistical fluctuations between the different specimens of the control heads 130, the operating positions between different specimens will at least slightly differ from each other. Therefore, if the front end 142 of the piston rod 140 was arranged at a specific operating position prior to the exchange of the control head 130, the front end 142 of the piston rod 140 will generally not coincide anymore with a specific operating position after having applied the replacement control head 130*b*. In this event, the replacement control head 130*b* can utilize the position sensing system 132 in order to sense the position of the front end 142 of the piston rod 140 relative to the operating positions defined by the replacement control head 130*b*.

The data processing unit 134 can be used to evaluate the data received from the position sensing system 132 relative to the operating positions defined by the replacement control head 130*b*. Accordingly, the data processing unit 134 determines the difference between the position of the front end 142 and a specific operating position according to which the front end 142 is supposed to be arranged. The data processing unit 134 is then able to determine whether this difference is within any of certain tolerance ranges. These may include any of an acceptable first tolerance range, a second tolerance range, and a third tolerance range. The data processing unit 134 may also be configured to evaluate whether the difference is outside any of these tolerance ranges. In this regard, the first and second tolerance ranges can correspond to configurations in which the process valve 100 can still be used although maintenance of the replacement control head 130*b* is recommended. The third tolerance range can correspond to a configuration in which the replacement control head 130*b* and/or the process valve 100 may be further used only according to an emergency mode. If the difference between the position of the front end 142 of the piston rod 140 and a specific operating position defined by the replacement control head 130*b* is outside the third tolerance range, the replacement control head 130*b* and/or the process valve 100 can be in an error state.

The indicator unit 138 can be configured to indicate to a user a state indicator representing the state of the process valve 100 determined by the data processing unit 134 as described above. In this regard, the indicator unit 138 can comprise a display at the replacement control head 130*b*. Also, or in addition, the indicator unit 138 can be configured to indicate the state indicator to a different field device, a field bus system, a gateway, or a higher-level control system.

Figure 2:
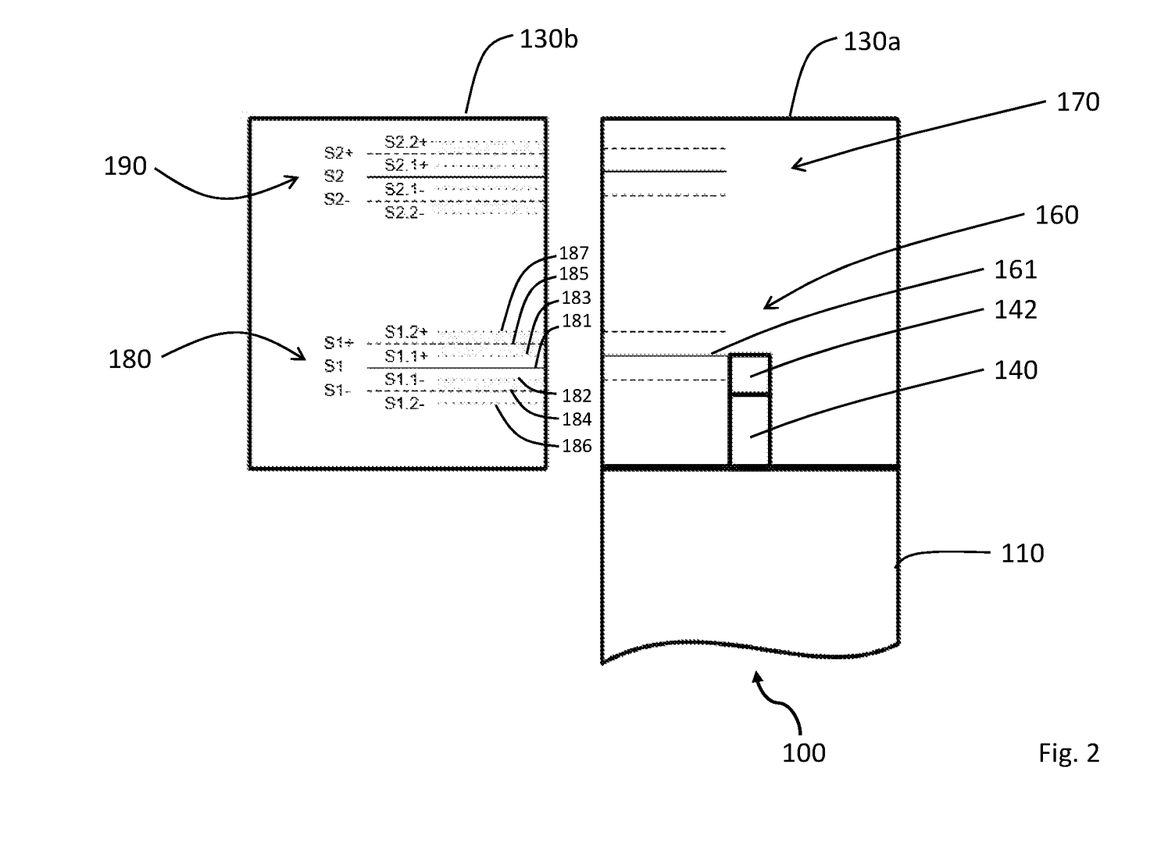
FIG. 2 shows a simplified schematic representation of a control head and a replacement control head.

FIG. 2 shows a simplified schematic representation of a control head 130*a* and a replacement control head 130*b*. Based on this figure the evaluated difference with regard to the position of the front end 142 of the piston rod 140 due to the exchange procedure will be described in more detail.

The first control head 130*a* is to be exchanged. For simplicity reasons the first control head 130*a* defines only a first operating configuration 160 and a second operating configuration 170. For each operating configuration 160, 170 a specific operating position is defined by control head 130*a*. For example, operating position 161 corresponds to the position at which the front end 142 of the piston rod 140 is arranged when the process valve 100 is in the first operating configuration 160.

If control head 130*a* is exchanged for a replacement control head 130*b* then the replacement control head 130*b* can receive configuration data and parameters of the replaced control head 130*a*. This can be achieved utilizing the communication unit 136 of the replacement control head 130*b*. Accordingly, based on the received configuration data and parameters the replacement control head 130*b* can also define two operating configurations 180, 190 which can generally correspond to the operating configurations 160, 170 of the replaced control head 130*a*. Due to statistical fluctuations during the production process or mounting the operating positions of the corresponding operating configurations do not need to coincide. For example, operating position 161 of the exchanged control head 130*a* does not necessarily coincide with operating position 181 of the replacement control head 130*b* although the respective operating configurations correspond to each other. As a consequence, if the front end 142 of the piston rod 140 was arranged at operating position 161 of the exchanged control head 130*a*, the front end 142 can be dislocated with regard to operating position 181 of the replacement control head 130*b* after having performed the exchange.

In order to automatically indicate to a user the extent of this dislocation and the state of the replacement control head 130*b* (in terms of recommended and required maintenance or an error state), the replacement control head 130*b* defines a first tolerance range, a second tolerance range, and a third tolerance range for each operating position. For the operating position 181 of the replacement control head 130*b* the first tolerance range is determined by the lines 182, 183. The first tolerance range is smaller than a second tolerance range determined by lines 184, 185 which itself is smaller than a third tolerance range defined by lines 186, 187.

The replacement control head 130*b* can then be configured to indicate, utilizing the indicator unit 138, the extent to which the position of the front end 142 differs from the operating position 181 based on the various tolerance ranges 182, 183, 184, 185, 186, 187. Moreover, the difference with regard to other operating positions defined by the replacement control head 130*b* can also be taken into account during this evaluation.

In this regard, the indicator unit 138 can provide a state indicator. Moreover, the determination of the difference between the front end 142 and the respective operating position can be based on the position sensing system 132 and the data processing unit 134.

Until the difference between the position of the front end 142 of the piston rod 140 and each respective operating position defined by the replacement control head 130*b* is determined, the state indicator can have a first value. The first value may indicate that maintenance is required. In other words, the state indicator will have the first value until for all operating positions the difference is determined, i.e.

until the process valve is activated to have every single of the operating configurations defined by the replacement control head 130b at least once such that the extent of the dislocation may be evaluated.

Since the control head 130a is exchanged while the higher-level process system is in operation, the consistency between the position of the front end 142 of the piston rod 140 with the "exchange"-operating position 181 (i.e. the operating position which the front end is arranged at when the exchange takes place) is most relevant. Therefore, the replacement control head 130b can be configured to determine whether the difference between the front end 142 and the specific operating position 181 is within a first tolerance range defined by lines 182, 183. Due to the relevance of this operating position, this tolerance range 182, 183 can be very small.

If the replacement control head 130b finds that the front end 142 is within the first tolerance range 182, 183 then the replacement control head 130b can be configured to determine whether the position of the front end 142 with regard to all remaining operating positions defined by the replacement control head 130b is at least within a second tolerance range 184, 185 for each of the remaining operating positions. The second tolerance range 184, 185 can be larger than the first tolerance range 182, 183. If the replacement control head 130b finds this condition to be fulfilled for all remaining operating positions (except the "exchange"-operating position for which the difference is within the first tolerance range 182, 183) then the state indicator switches from the first value to a second value. The second value may indicate that maintenance is not required but recommended. According to this scenario, the consistency between the front end 142 and the operating positions defined by the replacement control head 130b is quite good. However, the differences are still non-negligible. In order to balance the remaining differences, a full teaching of the replacement control head 130b with regard to the positions of the front end 142 can be performed.

If the replacement control head 130b finds that the front end 142 is outside the first tolerance range 182, 183 for the specific operating position according to which the front end 142 was arranged during the exchange process (the "exchange"-operating position), then the replacement control head 130b activates a third tolerance range 186, 187 (activates the respective feedback regime). In this event, the replacement control head 130b determines whether for each of the operating positions defined by the replacement control head 130b the difference is within the third tolerance range 186, 187. If this is true for all operating positions defined by the replacement control head 130b, the state indicator remains at having the first value. If, for any of the operating positions defined by the replacement control head 130b, the difference is outside the third tolerance range, the state indicator switches to a third value indicating an error state of the control head 130b and/or the process valve 100.

Figure 3:
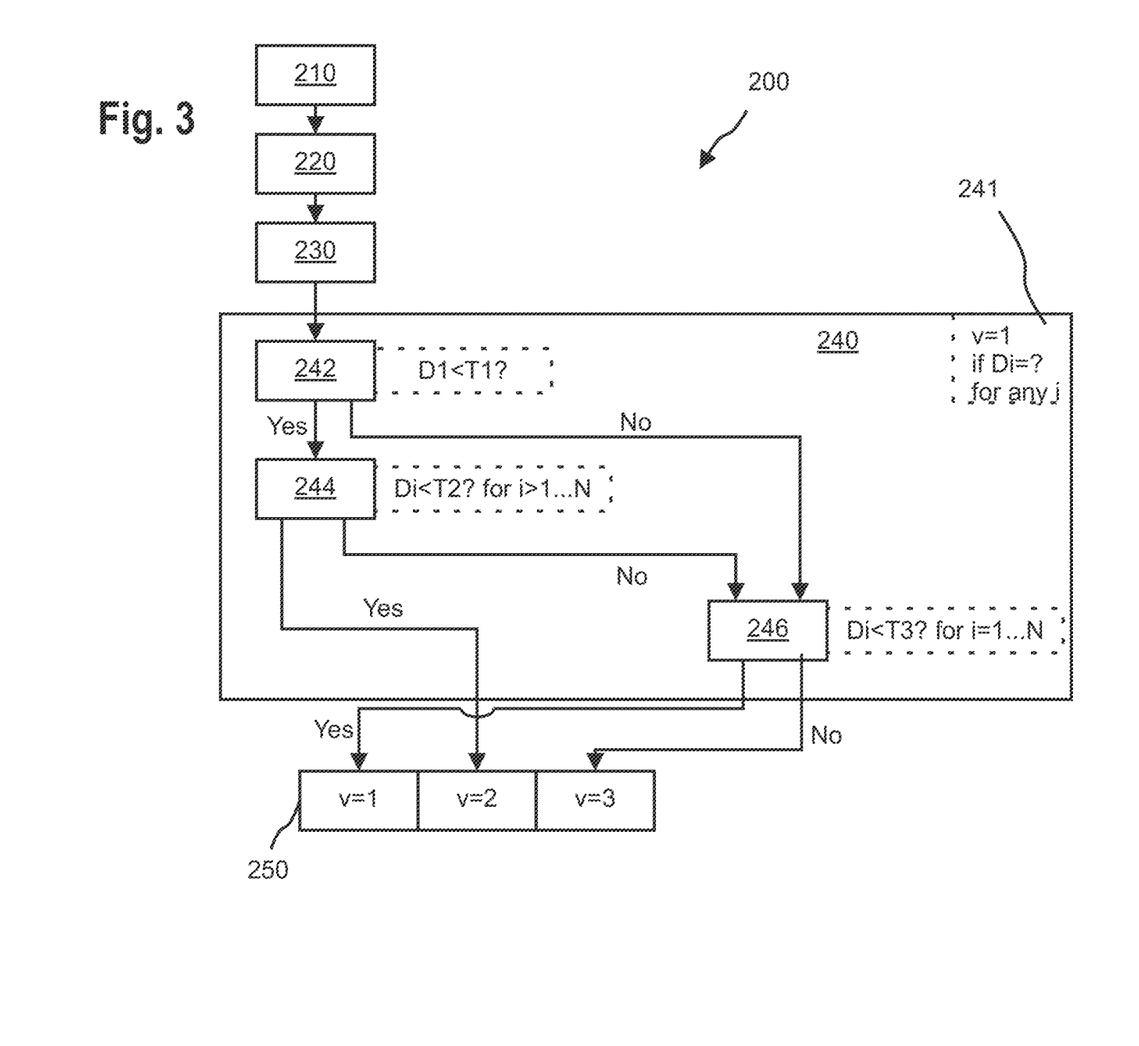
FIG. 3 shows a simplified schematic representation of a method for an operation-safe replacement of a control head.

FIG. 3 shows a simplified schematic representation of the method 200 for an operation-safe replacement of control head.

At step 210, the broken control head 130a is exchanged for a replacement control head 130b.

At step 220, the replacement control head 130b receives configuration data and parameters of the exchanged control head 130a by utilizing the communication unit 136. Based on the received data, the replacement control head 130b defines corresponding operating configurations and operating positions.

At step 230 the replacement control head 130b senses the position of the front end 142 of the piston rod 140 utilizing the position sensing system 132 for the operating position defined by the replacement control head 130b according to which the front end 142 is supposed to be arranged when the exchange procedure takes place.

The remaining steps of method 200 depend on the determination of the difference between the front end 142 of the piston rod 140 and the specific operating position 181 according to which the front end 142 is supposed to be arranged during the exchange procedure. Accordingly, step 240 comprises several substeps 242, 244, and 246.

In general, the data processing unit 134 of the replacement control head 130b is used to determine the relevant conditions at step 240. In this regard, the replacement control head 130b defines a plurality of operating positions i=1 to N. Furthermore, as has been described before for each operating position i=1 to N the difference Di between the front end 142 of the piston rod 140 at the respective operating position i=1 to N is determined on an individual basis. This means that the data processing unit 134 generally determines N differences Di with i=1 to N, each one for an individual operating position. In addition, for each operating position i=1 to N generally three tolerance ranges T1, T2, and T3 can be defined by the replacement control head 130b, wherein generally T1≤T2≤T3, preferably T1<T2<T3.

At substep 242 the replacement control head 130b evaluates whether for the specific operating position i=1 according to which the front end 142 of the piston rod 140 is arranged during the exchange procedure the difference D1 between the front end 142 and the operating position i=1 is within the first tolerance range T1, i.e. whether D1≤T1.

If substep 242 is found to be true the replacement control head 130b evaluates whether the difference Di for each remaining operating position defined by replacement control head 130b (i.e. for i>1 to N) is within the second tolerance range T2 at substep 244, i.e. whether Di≤T2 for i>1 to N.

If any one of the substeps 242 or 244 is found to be false, then the replacement control head 130b activates a third feedback regime corresponding to the third tolerance range T3 at substep 246. Subsequently, the replacement control head 130b evaluates at substep 246 whether the difference Di for each operating position i=1 to N defined by the replacement control head 130b is within the third tolerance range T3, i.e. whether Di≤T3 for i=1 to N.

Depending on the evaluation of the differences Di, the indicator unit 138 provides a state indicator. This is not only performed at step 250 if the evaluation procedure of step 240 is completed but is performed also during the evaluation procedure at step 240 itself. If any of the differences Di for at least one operating positions i=1 to N is yet to be determined during step 240, the state indicator has a first value V=1. This is indicated within step 240 by the dotted line box 241. The first value V=1 can describe that maintenance is required.

Once the evaluation procedure of step 240 is completed the state indicator may persist at having the first value V=1. This is the case if substep 246 is carried out and found to be true.

If substep 244 is carried out and found to be true, then the state indicator switches to a second value V=2 which describes that maintenance is recommended.

If substep 246 is carried out and found to be false, then the state indicator switches to yet another value, a third value V=3 which describes that the replacement control head 130b and/or the process valve 100 is in an error state.

Although the disclosure has been described hereinabove with reference to specific embodiments, it is not limited to these embodiments and no doubt further alternatives will occur to the skilled person that lie within the scope of the disclosure as claimed.

The invention claimed is:

1. A method for an operation-safe replacement of a control head, the control head configured to actuate a movement of a target, the control head defining at least a first operating position according to which the target is arranged prior to exchanging the control head, the method comprising:
   a) exchanging the control head for a replacement control head, such that the control head comprises an exchanged control head;
   b) receiving, via the replacement control head, configuration data and parameters of the exchanged control head, the replacement control head defining at least a second operating position, the second operating position of the replacement control head corresponding to the first operating position defined by the exchanged control head;
   c) sensing, via a position sensing system, a position of the target relative to the replacement control head; and
   d) providing, via an indicator unit, a state indicator, the state indicator at least depending on a difference between a position of the target and the second operating position defined by the replacement control head.

2. The method of claim 1, wherein the control head comprises a communication unit, the control head being configured to receive configuration data and parameters via the communication unit.

3. The method of claim 2, wherein the control head is configured to communicate, via the communication unit, with at least one of a field device, a gateway, and a master device.

4. The method of claim 1, wherein the control head comprises a data processing unit, wherein the data processing unit is coupled to the position sensing system, and wherein the difference between the position of the target and the second operating position defined by the replacement control head is determined using the data processing unit.

5. The method of claim 1, wherein the state indicator automatically has at least a first value and a second value, the first and second values indicating different scenarios of a conformity of the position of the target with regard to the second operating position defined by the replacement control head.

6. The method of claim 1, wherein the state indicator has at least a first value and a second value, wherein the replacement control head defines a plurality of operating positions, and wherein the state indicator has the first value until for all specific positions of the plurality of operating positions defined by the replacement control head the difference between the position of the target and the specific operating position is determined.

7. The method of claim 6, wherein the state indicator has the second value if for the specific operating position according to which the target is arranged when the control head is exchanged, the difference between the position of the target and the operating position defined by the replacement control head is smaller than or equal to a first distance, and if for each of the remaining operating positions of the plurality of operating positions defined by the replacement control head the difference between the position of the target and the specific operating position is smaller than or equal to a second distance, the second distance being larger than the first distance.

8. The method of claim 7, wherein the state indicator remains at having the first value if for the specific operating position according to which the target is arranged when the control head is exchanged, the difference between the position of the target and the operating position defined by the replacement control head is larger than the first distance or if for any of the plurality of operating positions defined by the replacement control head the difference between the position of the target and the specific operating position is larger than the second distance but smaller than or equal to a third distance, the third distance being larger than the second distance.

9. The method of claim 8, wherein the state indicator has a third value if for any for any specific position of the plurality of operating positions defined by the replacement control head the difference between the position of the target and the specific operating position is larger than the third distance.

10. A method for an operation-safe replacement of a control head, the control head configured to actuate a movement of a target, the control head defining at least a first operating position according to which the target is arranged prior to exchanging the control head, the method comprising:
    a) exchanging the control head for a replacement control head, such that the control head comprises an exchanged control head;
    b) receiving, via the replacement control head, configuration data and parameters of the exchanged control head, the replacement control head defining at least a second operating position, the second operating position of the replacement control head corresponding to the first operating position defined by the exchanged control head;
    c) sensing a position of the target relative to the replacement control head via a position sensing system configured to provide electronic information with regard to the sensed position of the target; and
    d) providing a state indicator via an indicator unit configured to indicate to a user the state indicator representing a state of a process valve, the state indicator at least depending on a difference between a position of the target and the second operating position defined by the replacement control head.

11. The method of claim 1, wherein the position sensing system is external to the replacement control head or part of the replacement control head, and wherein the position sensing system is configurable to provide electronic information with regard to a sensed position of the target.

12. The method of claim 1, wherein the indicator unit is coupled to the replacement control head or part of the replacement control head, and wherein the indicator unit is configurable to indicate to a user the state indicator representing a state of a process valve.

13. The method of claim 12, wherein the indicator unit comprises a status display arranged at the process valve and/or at the replacement control head, and/or wherein the indicator unit is configurable to communicate the state indicator to a different component of an associated process system.

14. The method of claim 2, wherein the communication unit is configurable to communicate with an industrial field bus system, and wherein a process valves and/or control heads comprise field devices of the industrial field bus system.

15. The method of claim 4, wherein the data processing unit evaluates data received from the position sensing system relative to a plurality of operating positions defined by the replacement control head that include the second operating position, and wherein the data processing unit determines a difference between a position of an end of the target and a specific operating position of the plurality of operating positions defined by the replacement control head.

16. The method of claim 15, wherein data processing unit determines whether the difference is within a specified tolerance range.

* * * * *